United States Patent [19]

Teot

[11] Patent Number: 4,790,958
[45] Date of Patent: Dec. 13, 1988

[54] CHEMICAL METHOD OF FERRIC ION REMOVAL FROM ACID SOLUTIONS

[75] Inventor: Arthur S. Teot, Midland, Mich.

[73] Assignee: The Dow Chemical Company, Midland, Mich.

[21] Appl. No.: 50,642

[22] Filed: May 18, 1987

Related U.S. Application Data

[63] Continuation-in-part of Ser. No. 831,739, Feb. 21, 1986, abandoned, which is a continuation-in-part of Ser. No. 700,789, Feb. 11, 1985, abandoned.

[51] Int. Cl.$^4$ .............................................. E21B 43/27
[52] U.S. Cl. .................................. 252/8.553; 166/307
[58] Field of Search ........................ 252/8.553, 8.551; 166/307

[56] References Cited

U.S. PATENT DOCUMENTS

| 1,877,504 | 9/1932 | Grebe et al. | 252/8.553 |
| 2,227,860 | 1/1941 | Morgan et al. | 252/8.553 |
| 2,232,931 | 2/1941 | Stone et al. | 252/8.553 |
| 3,107,221 | 10/1963 | Harrison et al. | 252/8.553 X |
| 3,348,613 | 10/1967 | Irani | 252/8.553 X |
| 3,916,994 | 11/1975 | Maddox et al. | 252/8.553 X |
| 4,167,214 | 9/1979 | Street | 166/307 |
| 4,366,073 | 12/1982 | McLaughlin et al. | 252/8.551 |
| 4,487,265 | 12/1984 | Watanabe | 166/307 |
| 4,574,050 | 3/1986 | Crowe et al. | 252/8.553 |

FOREIGN PATENT DOCUMENTS

WO83/01583 5/1983 PCT Int'l Appl. .................. 137/13

Primary Examiner—Herbert B. Guynn

[57] ABSTRACT

Onium species of nitrogen, phosphorus or sulfur are useful to precipitate ferric ion, existing as tetrahaloferrate anion, from strong haloacid solutions. The precipitants are useful in the field of well acidizing, because tetrahaloferrate anion attacks polymeric and viscoelastic surfactant thickeners used to thicken haloacid solutions.

32 Claims, No Drawings

CHEMICAL METHOD OF FERRIC ION REMOVAL FROM ACID SOLUTIONS

CROSS-REFERENCE TO RELATED APPLICATIONS

This application is a continuation-in-part of copending application Ser. No. 831,739, filed Feb. 21, 1986, now abandoned, which is a continuation-in-part of application Ser. No. 700,789, filed Feb. 11, 1985 and now abandoned.

FIELD OF THE INVENTION

This invention pertains to improved compositions, and to methods for acid treating or acidizing, and in particular to those compositions and methods which are adversely affected by the presence of undesirable ferric ions.

Acid treating or acidizing of porous subterranean formations penetrated by a well bore has been widely employed for increasing the production of fluids such as, crude oil, natural gas, etc., from said formations. The usual technique of acidizing a formation comprises introducing a nonoxidizing acid into the well under sufficient pressure to force the acid out into the formation where it reacts with the acid-soluble components of the formation. The technique is applied to formations of high acid solubility, such as lime stone, dolomite, etc., and is also applicable to other types of formations containing streaks or striations of acid-soluble components such as sandstone containing carbonate striations.

During the acid treatments, passageways in the formation for fluid flow are created or enlarged, thus stimulating the production of fluids from the formation. The action of the acid on the formation is often called etching. There are essentially two well known types of acid treatments used in the field, and these include matrix acidizing and fracture acidizing. Both types of treatments utilize acid compositions as pumpable fluids. In matrix acidizing operations, the acid is injected into the formation at a pressure or rate sufficient to force the fluid into the formation but insufficient to hydraulically fracture the formation. In fracture acidizing operations, the acid composition, which is usually in the form of a viscous gel, is used as a fracturing fluid which is pumped through the well bore into the formation at a sufficient rate and pressure to overcome the overburden pressure and thus fracture the formation.

One of the problems commonly encountered in acidizing operations is insufficient penetration of the formation by the acid. It is desirable that good penetration is obtained in order to realize maximum benefits from the operation. Too often the acid is essentially completely spent in the area immediately adjacent and surrounding the well bore. The severity of the problem increases with well depth and with increasing temperatures which enhance the reaction of the acid with the formation.

Poor penetration can also be caused, and/or aggravated, by fluid loss to the more porous zones of the formation or "thief zones." Poor penetration can also be caused and/or aggravated by leak-off at the fracture faces in combination fracturing-acidizing operations. Fluid loss or leak-off can frequently worsen the situation by leaving the tight (low permeability) zones of the formation unchanged and merely opening up the already high permeability zones. One solution which has been proposed for the above-discussed problem is to incorporate various thickening or gelling agents into the acid solutions. Such agents thicken the acid solution and increase the viscosity thereof. It has been disclosed that polymer-thickened acid solutions have improved fluid loss properties. For example, see U.S. Pat. Nos. 3,415,319 and 3,434,971. It has also been reported that the reaction rate of said polymer-thickened acid solutions with the acid-soluble portion of the formation is lessened or retarded. See, for example, U.S. Pat. Nos. 3,749,169; 3,236,305; 3,252,904; 4,055,502; 4,103,742 and 4,191,657. It has been disclosed that foams, including foamed acids, have improved fluid loss properties. For example, U.S. Pat. Nos. 3,937,283 and 4,235,734 disclose foamed acid systems which can be used for foam fracturing. However, such foams have stability problems Higher viscosities are also advantageous in combination fracturing-acidizing operations in that the more viscous acidic solutions produce wider and longer fractures. More viscous acid solutions are also more effective in carrying propping agents into the formation when propping agents are used.

Another problem encountered in acidizing operations, particularly when employing acidizing compositions having thickening or viscosifying agents incorporated therein, is stability to heat. By "stability to heat" is meant the retention of the increased or greater viscosity properties under the conditions of use. To be satisfactory, such compositions should be sufficiently stable to resist thermal viscosity loss in the presence of acid for a period of time sufficient to accomplish the intended purpose, e.g., good penetration and significant etching of the formation. The degree of stability required in any particular operation will vary depending upon the type of formation being treated, the temperature of the formation, the well depth, acid concentration, pump rates, shear rates, etc. For example, acidizing of a tight low permeability formation will proceed more slowly than with a more permeable formation, other factors being the same, because a longer time will be required to obtain a significant amount of etching.

The temperature of the formation usually has a pronounced effect on the stability of the acidizing compositions and, generally speaking, is one of the most important operating variables when considering stability. Increased formation temperatures usually have at least two undesirable effects. One such effect results in a decrease in viscosity. Another such effect is increased rate of reaction of the acid with the formation. Thus, some compositions which would be satisfactory in a low temperature formation such as in the Hugoton field in the Anadarko basin might not be satisfactory in formations encountered in deeper wells as in some West Texas fields.

In ordinary acidizing operations using unthickened acid solutions there is usually no problem in removing the spent acid because the viscosity is essentially that of water. However, some residues from the spent thickened or viscous acid solutions are difficult to remove from the pores of the formation of the fracture after the operation is complete. Sometimes the polymeric gelling agent precipitates from the spent acid and forms a clogging residue in the pores of the formation or in the fracture. This can inhibit the production of fluids from the formation and can require costly cleanup operations.

During such acid treatments, the treatment acid often dissolves iron scale in pipes and iron-containing minerals in the formation. The dissolved iron normally remains in solution until sufficient amounts of the acid are spent and the pH of the acid solution becomes about 3.2. At this pH, ferric hydroxide begins to precipitate and plug the formation. Ferrous hydroxide, begin more soluble, does not being to precipitate until a pH of approximately 7.7 and is not generally a problem.

The deleterious effects of ferric hydroxide in wells were recognized by Grebe in U.S. Pat. No. 2,175,081 as early as 1937 where a strong acid containing sulfurous acid is disclosed as a means of countering the precipitation problem. Numerous other procedures have been proposed for avoiding the ferric hydroxide problem. For example, U.S. Pat. No. 2,175,095 suggests including within the acidizing fluid a material such as lactic acid, ammonium acetate, glycine, glycolic acid, citric acid, or the like, which is capable of preventing the precipitation of iron or aluminum hydrates at normal precipitation pH values. U.S. Pat. No. 2,335,689 suggests adding an iron sequestering agent, such as a polyhydric phenol, within the injected acids. U.S. Pat. No. 3,142,335 suggests the use of a sequestering agent containing a mixture of ingredients that function as a pH buffer, such as citric acid or a citrate salt mixed with acetic or formic acids or their salts. U.S. Pat. No. 3,150,081 suggests using mixtures of hydroxyacetic and citric acids, which mixtures are alleged to be cheaper and more effective than the use of either acid alone.

The most common sequestering agents in commercial practice are citric acid, ethylenediaminetetraacetic acid (EDTA), nitrilotriacetic acid (NTA), acetic acid, lactic acid, and citric acid/acetic acid mixtures. Data on these sequestering agents is found in the paper by Smith et al., Paper No. SPE 2358, Society of Petroleum Engineers of AIME (presented Nov. 7-8, 1968).

The problem with most iron sequestering agents is that they are not particularly effective at temperatures beyond about 125° F.–150° F. Only NTA, citric acid and EDTA have shown any effectiveness at higher temperatures. Of these, EDTA is the only practical sequestering agent because citric acid tends to form insoluble citrates during the course of the well treatment. Such citrates can block the well production almost as effectively as the ferric hydroxide.

The presence of ferric ions in the treatment acid solution is known to cause other serious problems as well. For example, U.S. Pat. No. 4,096,914 teaches that ferric ion reacts with asphaltenic oil to form insoluble iron asphaltene compounds. These compounds are insoluble precipitates which likewise plug the formation channels and inhibit production of the desired fluid. The patent teaches that the problem can be solved by incorporating salicylic acid into the treatment acid.

Ferric ion corrosion can also be a problem. Two moles of ferric ion reacts with base metal to form three moles of ferrous ion. Almost any oxidizing source readily converts the ferrous ions to ferric ions, and a vicious circle results. Additives used to control problems associated with ferric ions in treatment of wells have been called "iron stabilizers" or "iron control agents" by practitioners in the field.

Another problem associated with the presence of ferric ions in a polymer thickened acid composition involves the precipitation of the polymer. That is, a precipitate forms which is believed to contain iron in a chemically combined form (i.e., such as a metal ion cross-linker) with the polymer. The precipitate is usually in the form of a gummy, insoluble mass that is very difficult, if not impossible, to resolubilize under the conditions of use for acid treatment fluids.

Viscoelastic surfactant compositions are effective and efficient thickeners for a variety of aqueous systems. Thus, it is contemplated that it would be desirable to employ viscoelastic surfactants in thickening acid solutions such as those containing relatively large amounts of hydrochloric acid. Unfortunately, the presence of ferric ions can lead to a loss of viscosity of the thickened acid solution.

In view of the deficiencies of the prior art, it would be highly desirable to provide an acid composition for use in acidic well treatments containing ferric ions and the method of using the same.

SUMMARY OF THE INVENTION

Ferric ion in contact with a high concentration of halide ions tends to form a tetrahaloferrate ($FeZ_4^\ominus$) anion. This anion provides a detrimental effect to the thickened acid solution because of association of a cationic surfactant and tetrahaloferrate anion, which can lead to a loss of viscosity of the thickened acid solution thickened with cationic surfactants.

In one aspect, the present invention is a process for precipitating undesired ferric ion existing as tetrahaloferrate anion from a strong haloacid solution, which process comprises contacting the acid solution with a precipitant which contains a soluble, nonsurfactant onium species of nitrogen, phosphorus and/or sulfur in an amount and under conditions sufficient to form insoluble precipitates with tetrahaloferrate anions and thereby to precipitate substantial amounts of tetrahaloferrate anion until a substantial amount of the acid is spent.

In another aspect, the present invention is a process for maintaining substantial viscosity of an acid composition comprising a thickening amount of a viscoelastic surfactant and/or a polymeric thickener and ferric ions in the presence of amounts of halide ions and hydrogen ions sufficient to provide tetrahaloferrate anions. In the method of the present invention, the acid composition is contacted with an amount of a precipitant comprising a soluble onium species sufficient to precipitate substantial amounts of the tetrahaloferrate anions such that substantial thickening of the acid composition is maintained until at least a substantial amount of the acid is spent.

Using the process of the present invention, an acidizing operation can be conducted using a thickened acid compositin without the thickener being affected by undesirable tetrahaloferrate ions during the acidizing operation thereby maintaining the thickness of the composition during the operation. However, following acid treatment, the spent acid composition can easily be removed from the formation. Specifically, the onium precipitant forms an insoluble precipitate with the tetrahaloferrate ion which remains insoluble (thereby preventing the undesirable reaction of the tetrahaloferrate ion with the thickener) while the acid concentration is high. As the acid is spent, the hydrogen ion concentration decreases and the onium tetrahaloferrate compound dissociates. Upon dissociation, the tetrahaloferrate ion redissolves, thereby faciliating removal of the spent acid composition from the formation. Therefore, the production of oil or gas from a subterranean formation can be increased using the method of the present invention.

In a third aspect, the present invention is a thickened composition comprising (a) an aqueous fluid comprising a haloacid;

(b) a precipitant for tetrahaloferrate anions comprising an acid soluble, nonsurfactant onium species of nitrogen, phosphorus or sulfur which forms insoluble complexes or compounds with tetrahaloferrate anions; and (c) a thickening amount of a viscoelastic surfactant and/or polymeric thickener.

The acid composition of the present invention can be used in fracture acidizing. The thickener provides an improved means for reducing the rate at which fluid is lost into the subterranean formation. The acid composition is also useful for matrix acidizing where the thickener provides a controlled rate of reaction of acid within the subterranean formation to increase penetration of said acid into the formation. In either case, the presence of the onium precipitant prevents problems associated with viscosity loss due to destabilization or precipitation of the viscoelastic surfactant or polymeric thickener in the presence of tetrahaloferrate anions.

DETAILED DESCRIPTION OF THE INVENTION

Precipitants which can be employed in the practice of the present invention are onium species which are soluble in the acidic composition and which are capable of forming an insoluble complex or compound with the tetrahaloferrate anions. In general, the onium species can be represented by the structural formula:

$$(MR_n)^+ X^- \qquad (I)$$

wherein M is an onium forming species, each R is independently hydrogen, a hydrocarbyl group or an inertly-substituted hydrocarbyl group selected such that the onium species is soluble in the acid composition but the complex or compound formed by reaction with tetrahaloferrate ions is insoluble in the acid composition, n is the number of R groups bonded to the onium forming species and will vary depending on the particular onium forming species and $X^-$ is a suitable anion. Preferably, each R is selected such that the onium species is capable of forming at least a 0.5, more preferably at least a 1, weight percent solution in the acid composition and at ambient temperatures, e.g., temperatures of about 20° C. to 25° C. In addition, each R is selected such that essentially none of the complex or compound formed by the reaction of the tetrahaloferrate anions with the onium species is soluble in the acid composition. In addition, the R groups are selected such that the onium species is not surface active to an extent such that the viscoelastic character of the viscoelastic thickener, if employed, is adversely and significantly affected.

The onium forming species M can be sulfur, in which case n is three, but is more preferably nitrogen or phosphorus, in which case n is four. The counterion X is preferably a halide such as chloride or bromide, sulfonate, acetate or nitrate, more preferably a halide and most preferably chloride.

One or two of the R groups may be hydrogen, as long as the others are selected to impart the desired solubility properties without imparting substantial surface active properties to the precipitant. When one or more R group is hydrogen, the onium precipitant can be generated simply by adding the corresponding secndary or tertiary amine or phosphine to the acid solution, generating the protonated onium precipitant. Preferably, no more than one R group is hydrogen. Most preferably, all R groups are hydrocarbyl or inertly-substituted hydrocarbyl and the onium precipitant is a quaternary onium species.

The specific R groups required to provide the onium species with the desired solubility properties can vary depending upon the specific onium forming species (M), the acid composition employed and the other R groups making up the onium species. For example, one, two or even three of the R groups can be methyl or ethyl or up to two R groups may be hydrogen if the other R groups(s) are selected to impart the desired solubility properties without imparting significant surface active properties to the onium species. However, if one or more R group is sufficiently large, e.g., each R group is a $C_{16}$ alkyl group, the resulting onium species can be insoluble or impart sufficient surface active properties to adversely affect the thickening. Preferably, each R is independently a hydrocarbyl group containing from about 3 to less than about 12 carbon atoms or a symmetrical aryl group and the entire onium precipitant contains no more than about 20 carbon atoms if the R groups are aliphatic, or no more than 25 atoms if the R groups are aromatic. More preferably, each R group is independently an alkyl group of from 3 to about 6 carbon atoms. If one or more R group is hydrogen, then the remaining R groups most preferably contain 3 to 9 carbon atoms.

Representative examples of quaternary onium precipitants useful in the present invention include dioctyldimethylammonium chloride, benzyltriethylammonium bromide, tri-n-pentylmethylammonium chloride, tetrabutylammonium bromide, tetrabutylammonium chloride, tetraphenylammonium chloride, tetrabutylammonium tetrafluoroborate, tetrabutylammonium hydrogen sulfate, tetrabutylammonium acetate, tetrabutylammonium toluene-4-sulfonate, tetrahexylammonium iodide, tetrabutylphosphonium chloride, tetraphenylphosphonium bromide, triethylphenylammonium iodide, benzyltri-n-butylammonium chloride, and tetrabutylphosphonium bromide. Other precipitants useful in the present invention include the protonated salts of dioctylamine, tripentylamine or tributylphosphine.

Although the amount of precipitant which is most advantageously employed can vary depending upon the amount of ferric ion which is present in the thickened acid composition, the precipitant is preferably employed in an amount sufficient to precipitate essentially all the ferric ion. However, lesser amounts of precipitant can be employed. In general, the precipitant is employed in amounts of from about 0.5 to about 2, preferably from 0.8 to about 1.5, more preferably from 0.9 to 1.5, moles of precipitant per mole of ferric ion present in the acid-containing formulation.

It is highly preferable that the ferric acid be present in a large excess of halide ions, as for example, chloride ions resulting from high concentrations of hydrochloric acid. It is believed that in the presence of high amounts of halide ions the ferric ions in solution are present in the form of a tetrahaloferrate (e.g., $FeZ_4^-$ wherein Z is a halide such as chloride) anion. The precipitation and hence the removal of the ferric ions (i.e., the tetrahaloferrate) from solution is due to the precipitation of the reaction product of these anions with the onium species. Thus, if insufficient halide ion as is generated from the haloacid is present, the anionic $FeZ_4^-$ species does not form to an appreciable extent and the precipitation will not occur. It is understood that the resulting precipitate of onium ion and tetrahaloferrate ion can redissolve as appreciable amounts of acid are spent.

The amount of ferric ion which is present in the acid fluid can vary and can depend upon a variety of circumstances. For purposes of this invention it is necessary to have enough ferric ion present in order to adversely affect the viscosity of the thickened acid fluid. Typically, the amount of ferric ion which is present is limited by practical considerations, however amount of ferric ion in the acid fluid can vary from greater than 0 ppm ferric ion to about 2000 ppm, normally from about 200 to about 600 ppm.

The term "viscoelastic" as it applies to liquids, means a viscous liquid having elastic properties, i.e., the liquid at least partially returns to its original form when an applied stress is released. The property of viscoelasticity is well-known in the art and reference is made to Barnes, Eastwood & Yates, *A Comparison of the Rheology of Two Polymeric & Two Micellar Systems*, 14 Rheologica Acta 53 (1875) and S. Gravsholt, *Viscoelasticity in Highly Dilute Aqueous Solutions of Pure Cationic Detergents*, 57 J. Colloid & Interface Sci. 575 (1976), which are hereby incorporated by reference for a definition of viscoelasticity and tests to determine whether a liquid possesses viscoelastic properties. Of the test methods specified by these references, one test which has been found to be most useful in determining the viscoelasticity of an aqueous solution consists of swirling the solution and visually observing whether the bubbles created by the swirling recoil after the swirling is stopped. Any recoil of the bubbles indicates viscoelasticity.

Surfactant compounds within the scope of this invention include compounds broadly classified as surfactants which, through the proper choice of counterion structure and environment, give viscoelasticity. The term "surfactant" is taken to mean any molecule having a characteristic amphiphatic structure such that it has the property of forming colloidal clusters, commonly called micelles, in solution.

In general, cationic surfactant compounds comprise an cationic, hydrophilic moiety chemically bonded to a hydrophobic moiety (herein called a surfactant ion) and a counterion sufficient to satisfy the charge of the surfactant ion. Examples of such surfactant compounds are represented by the formula:

$$R_1(Y^\oplus)X^\ominus$$

wherein $R_1(Y^\oplus)$ represents a surfactant ion having a hydrophobic moiety represented by $R_1$ and an ionic, solubilizing moiety represented by the cationic moiety $(Y^\oplus)$ chemically bonded thereto. $X^\ominus$ is the counterion associated with the surfactant ion.

In general, the hydrophobic moiety (i.e., $R_1$) of the surfactant ion is hydrocarbyl or inertly-substituted hydrocarbyl wherein the term "inertly-substituted" refers to hydrocarbyl radicals having one or more substituent groups, e.g., halo groups such as —F, —Cl or —Br or chain linkages, such as a silicon linkage (—Si—), which are inert to the aqueous liquid and components contained therein. Typically, the hydrocarbyl radical is an aralkyl group or a long chain alkyl or inertly-substituted alkyl, which alkyl groups are generally linear and have at least about 15, advantageously at least about 16, carbon atoms. Representative long chain alkyl and alkenyl groups include dodecyl (lauryl), tetradecyl (myristyl), hexadecyl (cetyl), octadecenyl (oleyl), octadecyl (stearyl) and the derivatives of tallow, coco and soya. Preferred alkyl and alkenyl groups are generally alkyl and alkenyl groups having from about 16 to about 24 carbon atoms, with oleyl, hexadecyl, erucyl and tetradecyl being the most preferred.

The cationic, hydrophilic moieties (groups), i.e., $(Y^\oplus)$, are generally onium ions wherein the term "onium ions" refers to a cationic group which is essentially completely ionized in water over a wide range of pH, e.g., pH values from about 2 to about 12. Representative onium ions include quaternary ammonium groups, i.e., $-N^\oplus(R)_3$; tertiary sulfonium groups, i.e., $-S^\oplus(R)_2$; quaternary phosphonium groups, i.e., $-P^\oplus(R)_3$ and the like, wherein each R is individually a hydrocarbyl or inertly-substituted hydrocarbyl. In addition, primary, secondary and tertiary amines, i.e., $-NH_2$, $-NHR$ or $-N(R)_2$, can also be employed as the ionic moiety if the pH of the aqueous liquid being used is such that the amine moieties will exist in ionic form. A pyridinium moiety can also be employed. Of such cationic groups, the surfactant ion of the viscoelastic surfactant is preferably prepared having quaternary ammonium, i.e., $-N^\oplus(R)_3$; a pyridinium moiety; an arylor alkarylpyridinium; or imidazolinium moiety; or tertiary amine, $-N(R)_2$, groups wherein each R is independently an alkyl group or hydroxyalkyl group having from 1 to about 4 carbon atoms, with each R preferably being methyl, ethyl or hydroxyethyl.

Fluoroaliphatic species suitably employed in the practice of this invention include organic compounds represented by the formula:

$$R_fZ^1$$

wherein $R_f$ is a saturated or unsaturated fluoroaliphatic moiety, preferably containing a $F_3C-$ moiety and $Z^1$ is a cationic moiety or potentially cationic moiety.

The fluoroaliphatics can be perfluorocarbons. Suitable cationic moieties will be described hereinafter. The fluoroaliphatic moiety advantageously contains from about 3 to about 20 carbons wherein all can be fully fluorinated, preferably from about 3 to about 10 of such carbons. This fluoroaliphatic moiety can be linear, branched or cyclic, preferably linear, and can contain an occasional carbon-bonded hydrogen or halogen other than fluorine, and can contain an oxygen atom or a trivalent nitrogen atom bonded in the skeletal chain. More preferable are those linear perfluoroaliphatic moieties represented by the formula: $C_nF_{2n+1}$ wherein n is in the range of about 3 to about 10. Most preferred are those linear perfluoroaliphatic moieties represented in the paragraphs below.

The fluoroaliphatic species can be a cationic perfluorocarbon and is preferably selected from a member of the group consisting of $CF_3(CF_2)_rSO_2NH(CH_2)_sN^\oplus R''_3X^\ominus$; $R_FCH_2CH_2SCH_2CH_2N^\oplus R''_3X^\ominus$ and $CH_3(CF_2)_rCONH(CH_2)_sN^\oplus R''_3X^\ominus$; wherein $X^\ominus$ is a counterion described hereinafter, $R''$ is lower alkyl containing between 1 and about 4 carbon atoms, r is about 2 to about 15, preferably about 2 to about 6, and s is about 2 to about 5. Examples of other preferred cationic perfluorocarbons, as well as methods of preparation, are those listed in U.S. Pat. No. 3,775,126.

The counterions (i.e., $X^\ominus$) associated with the surfactant ions are most suitably ionically charged, inorganic or organic materials having ionic character opposite that of the surfactant ion, which combination of counterion and surfactant ion imparts viscoelastic properties to an aqueous liquid. The organic material having an anionic character serves as the counterion for a surfactant ion having a cationic, hydrophilic moiety. In general, the suitable counterions exhibiting an anionic character contain a halide, or sulfonate group. Representative of such anionic counterions which, when employed with a cationic surfactant ion, are capable of imparting viscoelastic properties to an acidic liquid include various aromatic sulfonates such as p-toluene sulfonate and naphthalene sulfonate; and the like, where such counterions are soluble. Inorganic counterions can also be employed, and examples of such ions include nitrite, bromide, chloride, bisulfate, tetrafluoroborate, and the like.

The particular surfactant ion and the counterion associated therewith are selected such that the combination imparts viscoelastic properties to an acidic liquid. Of the aforementioned surfactant ions and counterions, those combinations which form such viscoelastic surfactants will vary and are easily determined by the test methods hereinbefore described. Of the surfactants which impart viscoelastic properties to an aqueous liquid, particularly suitable surfactant compounds include those represented by the formula:

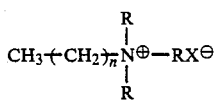

wherein n is an integer from about 13 to about 23, preferably an integer from about 15 to about 21; each R is independently hydrogen or an alkyl group, or alkylaryl, or a hydroxyalkyl group having from 1 to about 4 carbon atoms, preferably each R is independently methyl, hydroxyethyl, ethyl or benzyl, and $X^\ominus$ is a suitable counterion as previously described. In addition, each R can form a pyridinium moiety and the long chain of n+1 carbons may include some unsaturated carbons. Especially preferred surfactant ions include cetyltrimethylammonium, oleyltrimethylammonium, erucyltrimethylammonium and cetylpyridinium.

Other surfactant compounds include those represented by the formula:

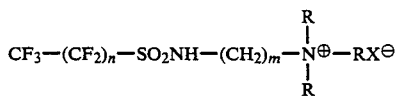

wherein n is an integer from about 5 to about 15, preferably from about 3 to about 8; m is an integer from about 2 to about 10, preferably from about 2 to about 5; R is a previously defined, most preferably methyl; and $X^\ominus$ is as previously defined.

The viscoelastic surfactants are easily prepared by admixing the basic form of the desired cationic surfactant ion with a stoichiometric amount of the acidic form of the desired cationic counterion. Alternatively, stoichiometric amounts of the salts of the cationic surfactant ion and the anionic counterion can be admixed to form the viscoelastic surfactant. See, for example, the procedures described in U.S. Pat. No. 2,541,816.

In general, surfactant compounds having a hydrophobic moiety chemically bonded to a nonionic, hydrophilic moiety are those nonionic surfactants which exhibit a viscoelastic character, and are typically described in U.S. Pat. No., 3,737,107; and those alkylphenyl ethoxylates as are described by K. Shinoda, *Solvent Properties of Nonionic Surfactants in Aqueous Solutions* in Solvent Properties of Surfactant Solutions 27, 28–29 & FIG. 2 (K. Shinoda, ed. 1967), which are incorporated herein by reference. Preferred nonionic surfactants are those tertiary amine oxide surfactants which exhibit viscoelastic character. In general the hydrophobic moiety can be represented as the previously described $R_1$. It is understood that the nonionic surfactant can be employed in the process of this invention in combination with an additional amount of an electrolyte as described hereinafter. It is also desirable to employ an additive such as an alkanol in the aqueous liquid to which the nonionic surfactant is added in order to render the surfactant viscoelastic. It is also desirable to provide mixtures of nonionic and cationic viscoelastic surfactants. Such mixtures preferably comprise ten to ninety percent cationic surfactant and ten to ninety percent anionic surfactant.

The viscoelastic surfactant (whether cationic or nonionic or mixture) is employed in an amaount sufficient to impart viscoelastic properties to the fluid, wherein the viscoelasticity of the fluid is measured by the techniques described herein. In general, such amount of viscoelastic surfactant is sufficient to measurably increase the viscosity of the acid composition. The specific viscoelastic surfactant employed and the concentration thereof in the fluid are dependent on a variety of factors including solution composition, temperature, and shear rate to which the flowing fluid will be subjected. In general, the concentration of any specific viscoelastic surfactant most advantageously employed herein is easily determined by experimentation. In general, the viscoelastic surfactants are preferably employed in amounts ranging from about 0.1 to about 10 weight percent based on the weight of the surfactant composition and acid-containing fluid. The viscoelastic surfactant is more preferably employed in amounts from about 0.5 to about 5 percent based on the weight of the fluid and the surfactant composition.

Depending on the specific surfactant ion and counterion associated therewith, less than a stoichiometric amount of the counterion can be employed to impart viscoelastic properties to a liquid. For example, when the surfactant ion is a long chain alkyl bonded to a quaternary ammonium and the counterion is an aromatic salicylate, although greater than stoichiometric amounts of an electrolyte which generates, upon dissociation, a salicylate anion, can be employed, water and other aqueous liquids can be effectively thickened using stoichiometric or even lesser amounts of the electrolyte. In fact, when the counterion contains an alkyl group which is greater than about 6 carbon atoms, lesser than stoichiometric amounts of the counterion are advantageously employed. However, in many instances, particularly when the counterion is an inorganic ion such as chloride ion, viscoelastic properties are imparted to an aqueous liquid only when an electrolyte is employed in substantial stoichiometric excess. For example, in such instances, the surfactant may not impart desired viscoelastic properties to water, but will impart desired viscoelastic properties to a salt solution such as brine. As the term is used herein, "viscoelastic surfactant" refers, if the counterion is employed in stoichiometric or lesser amounts, only to the surfactant ion and that amount of counterion actually employed or, if more than stoichiometric amounts of counterion are employed, to the surfactant ion and the stoichiometric amount of counterion (i.e., it excludes the excess amount, if any, of counterion).

The amounts of additional counterion, if any, employed are dependent on a variety of factors including the particular fluid, viscoelastic surfactant and electrolyte employed, and the precipitant/ferric ion mole ratio. In general, the concentration of the additional counterion will advantageously range from about 0.1 to about 20, preferably from about 0.5 to about 5, moles per mole of the viscoelastic surfactant.

In general, the counterions are formed by the dissociation of corresponding electrolytes, including salts and acids of a suitable organic ion. Preferably, the electrolyte is the same or generates the same ion associated with the surfactant ion of the viscoelastic surfactant contained by the aqueous liquid. Moreover, it is also understood that the electrolyte can be different from the counterion which is employed.

Acids useful in the practice of this invention include, for example, inorganic acids such as hydrochloric acid, hydrobromic acid; and a mixture of hydrochloric acid and hydrobromic acid; and combinations of acids therewith. The nonoxidizing acids are preferred. The concentration or strength of the acid can vary depending upon the type of acid, the type of formation being treated and the result desired in the particular treating operation. Most preferably, the acid used in the practice of this invention is hydrochloric acid. The acids used in the practice of this invention are typically employed as fluids; most preferably an aqueous fluid. It is necessary that the halide ion concentration and hydrogen ion concentration be great enough to form the tetrahaloferrate ion. Typically, concentrations of haloacids, such as hydrochloric acid, range from about 10 to about 40, preferably from about 15 to about 30 weight percent based on the weight of acid plus fluid.

The gelled acidic composition of the present invention can be prepared on the surface in a suitable tank equipped with a suitable means for mixing and then pumped down into the well and into the formation employing conventional equipment for pumping acidic compositions. Most preferably, the viscoelastic surfactant composition is mixed with the acid at temperatures of about 60° F. to about 90° F. Viscosity development is quite rapid.

The gelled acid compositions of the invention can be prepared on the surface in a suitable tank equipped with suitable mixing means, and then pumped into the formation employing conventional equipment for pumping acidic composition. However, it is within the scope of the invention to prepare said compositions while they are being pumped down the well. This technique is sometimes referred to as "on the fly." For example, a solution of the viscoelastic surfactant and/or polymer composition in an aqueous acid formulation can be prepared in a tank adjacent to the well head. Pumping of this solution through a conduit to the well head can be started. Then, downstream from the tank, a suitable connection can be provided for introducing the precipitant into said conduit. As will be understood by those skilled in the art, the rate of introduction of said components into said conduit will depend upon the pumping rate of the thickened acid solution through said conduit. Any of the above-mentioned orders of addition can be employed in said "on the fly" technique. For example, the viscoelastic surfactant and/or polymer, and precipitant can be added together or separately downstream from the aforementioned tank. Mixing devices can be provided in said conduit, if desired.

For fracture acidizing treatments, the compositions of this invention are injected into a bore hole at a sufficient rate and pressure to initiate and propagate a crack or fracture in the formation. Sand, or other proppant material can be included in the treating fluid to prevent the fracture from closing as can occur in heterogeneous rock formations. In a matrix acidizing operation, the treatment fluid is injected into the borehole at a rate and pressure sufficient to force the acid out into the formation but insufficient to cause fracturing of the formation.

It is understood that the process of this invention will allow the skilled artisan to thicken acid formulations which can contain undesirable ferric ions in a wide variety of industrial applications in which thickened acid formulations are useful.

The following examples will serve to further illustrate the invention but should not be considered as limiting the scope thereof. Unless otherwise noted, all parts and percentages are by weight.

EXAMPLE 1

Sample Nos. 1–3 are prepared by contacting an aqueous hydrochloric acid solution having an acid concentration as shown in Table I with 1000 ppm ferric ions in a screw-capped wide mouth bottle. To the acid solution is added tetrabutylammonium bromide as a 20 percent active aqueous solution in an amount relative to the amount of ferric ions as shown in Table I. The mixture is agitated and filtered. The filtrate is contacted with a thickening amount of a viscoelastic formulation comprising 1.65 percent erucyltrimethylammonium chloride, 0.7 percent erucyl bis(2-hydroyethyl)amine and 0.18 percent cocoamidopropyldimethylamine oxide based on the weight of the aqueous acid solution. The sample is heated to 85° C. and agitated intermittently until dissolution of the components is complete. To the formulation is added an effective amount of a commercially available corrosion inhibitor.

Viscosities of the formulation are measured at 25° C. and 55° C. using a Haake viscometer at a shear rate of 173 sec$^{-1}$. Data are presented in Table I.

Sample Nos. 4–6 are prepared as are the previously described Sample Nos. 1–3, however the viscoelastic surfactant composition comprises 2.4 percent of a 9:1 mixture of erucylmethyl bis(2-hydroxyethyl)ammonium chloride and erucyl bis(2-hydroxyethyl)amine.

Sample Nos. 7–9 are prepared as are the previously described Sample Nos. 4–6, however the viscoelastic surfactant comprises 2.4 percent of a 7:3 mixture of erucylmethyl bis(2-hydroxyethyl) ammonium chloride and erucyl bis(2-hydroxyethyl)amine.

For comparison purposes is prepared as acid formulation comprising aqueous 28 percent hydrochloric acid, 1000 ppm ferric ion and corrosion inhibitor. The sample is designated as Sample No. C-1. Viscosity data of the sample at 25° C. and 55° C. are presented in Table I.

For comparison purposes is prepared an acid formulation comprising aqueous 28 percent hydrochloric acid, 1000 ppm ferric ion, corrosion inhibitor and a viscoelastic surfactant formulation comprising 1.45 percent active surfactant mixture based on the weight of the acid formulation. The composition of the surfactant mixture comprises 63.6 percent erucylmethyl bis(2-hydroxyethyl)ammonium chloride, 36.1 percent erucyl bis(2-hydroxyethyl)amine, 0.3 percent cocoamidopropyldimethylamine oxide. The surfactant mixture is employed as a 28.1 percent active mixture in water, glacial acetic acid, sodium hydroxide and isopropanol. In this way, the erucyl bis(2-hydroxyethyl)amine is converted to erucyl bis(2-hydroxyethyl)amine acetate. The sample is designated as Sample No. C-2. Viscosity data of the sample of 25° C. are presented in Table I.

TABLE I

| Sample No. | HCl Concentration (percent) | Precipitant/$Fe^{3+}$ Mole Ratio | Viscosity (cps) 25° C. | 55° C. |
|---|---|---|---|---|
| 1 | 15 | 1.60 | 78 | 53 |
| 2 | 20 | 1.60 | 98 | 99 |
| 3 | 28 | 1.60 | 80 | 52 |
| 4 | 15 | 1.10 | 70 | 83 |
| 5 | 20 | 1.10 | 113 | 120 |
| 6 | 28 | 1.10 | 71 | 95 |
| 7 | 15 | 1.35 | 94 | 88 |
| 8 | 20 | 1.35 | 93 | 148 |
| 9 | 28 | 1.35 | 92 | 75 |
| C-1 [1] | 28 | — | 2 | 1 |
| C-2 [1] | 28 | — | 6 [2] | — |

[1] Not an example of the invention.
[2] Mixture forms two liquid phases.

The data in Table I illustrate that depending upon the amount and composition of the viscoelastic surfactant composition, adequate thickening of Sample Nos. 1–9 can occur at both low and high temperatures when the acid formulations are treated with the onium precipitant. An untreated sample (Sample No. C-2) exhibits an undesirably low viscosity.

EXAMPLE 2

An aqueous hydrochloric acid solution containing 28 percent hydrochloric acid is contacted with 1000 ppm ferric ions. To the solution is added an amount of tetrabutylammonium bromide in a manner described in Example 1. The precipitate which forms is filtered and the filtrate is analyzed for iron content. Data concerning iron removal is presented in Table II.

| Sample No. | Precipitant/$Fe^{3+}$ Mole Ratio | Residual $Fe^{3+}$ Filtrate (ppm) |
|---|---|---|
| 10 | 2.2 | 0.5 |
| 11 | 1.1 | 2.0 |
| 12 | 0.9 | 60 |
| 12 | 0.55 | 400 |
| 14 | 0.25 | 620 |

The data in Table II illustrate that depending upon the amount of onium precipitant which is employed, it is possible to effectively remove undesirable ferric ions from a concentrated acid formulation. The precipitation reaction is very complete and is essentially stoichiometric.

What is claimed is:

1. A process for thickening a strong aqueous haloacid in the presence of tetrahaloferrate ions comprising in any order the steps of:
   (a) contacting said acid solution with a thickening amount of polymeric thickener or viscoelastic surfactant thickener composition containing cationic viscoelastic surfactants; and
   (b) contacting said acid solution with an onium species conforming to the structural formula:

$$(MR_n)^+ X^- \qquad (I)$$

wherein
M is nitrogen, phosphorus or sulfur,
at least two R groups are hydrocarbyl or inertly-substituted hydrocarbyl groups comprising from about 3 to about 12 carbon atoms and each other R group is hydrogen, a hydrocarbyl group or inertly-substituted hydrocarbyl group, said R groups being chosen such that the moiety $(MR_n)^+$ is soluble in the acid solution but is not surface active and forms an insoluble precipitate with tetrahaloferrate anions,
n is the number of R groups bonded to the onium forming species, and
$X^-$ is a suitable counterion, under conditions and in an amount such that said onium species forms an insoluble precipitate with substantial amounts of the tetrahaloferrate anions and such that substantial viscosity of the acid composition is maintained.

2. The process of claim 1 wherein said tetrahaloferrate anions are tetrachloroferrate anions.

3. The process of claim 1 wherein M is sulfur and n is three.

4. The process of claim 1 wherein M is nitrogen or phosphorus, and n is four.

5. The process of claim 4 wherein the onium precipitant is a quaternary onium species.

6. The process of claim 5 wherein $X^-$ is a halide, sulfonate, acetate or nitrate ion, and each R is independently a hydrocarbyl group of from about 3 to about 12 carbon atoms chosen so that the entire onium precipitant contains no more than 20 carbon atoms if the R groups are aliphatic or 25 carbon atoms if the R groups are aromatic.

7. The process of claim 6 wherein each R group is an alkyl group of from 3 to about 6 carbon atoms, and $X^-$ is a halide ion.

8. The process of claim 7 wherein the precipitant is tetrabutyl ammonium chloride, tetrabutyl phosphonium chloride, tetraphenyl ammonium chloride and/or tetraphenyl phosphonium chloride.

9. The process of claim 4 wherein the onium precipitant is a protonated secondary or tertiary amine or phosphine.

10. The process of claim 9 wherein $X^-$ is a halide, sulfonate, acetate or nitrate ion, and one or two R groups are hydrogen and the remaining R groups are independently hydrocarbyl groups with from 3 to 12 carbon atoms choses so that the entire onium precipitant contains no more than 20 carbon atoms if the R groups are aliphatic or 25 carbon atoms if the R groups are aromatic.

11. The process of claim 10 wherein each hydrocarbyl group on the onium precipitant is an alkyl group of from 3 to 9 carbon atoms, and $X^-$ is a halide ion.

12. The process of claim 11 wherein the onium precipitant is a protonated form of tributyl phosphine, tripentyl amine, and/or dioctyl amine.

13. The process of claim 1 wherein said acid composition is a fluid comprising a haloacid at a concentration ranging from about 10 to about 40 percent, based on the weight of haloacid plus fluid.

14. The process of claim 1 wherein said viscoelastic surfactant composition comprises a cationic, hydrophilic moiety chemically bonded to a hydrophobic moiety and a counterion sufficient to satisfy the charge of the surfactant ion.

15. The process of claim 14 wherein said viscoelastic surfactant compounds are represented by the formula:

$$R_1(Y^{\oplus})X^{\ominus}$$

wherein $R_1(Y^{\oplus})$ represents a surfactant ion having a hydrophobic moiety represented by $R_1$ and an ionic, solubilizing moiety represented by the cationic moiety $(Y^{\oplus})$ chemically bonded thereto, and $X^{\ominus}$ is the counterion associated with the surfactant ion.

16. The process of claim 1 wherein said viscoelastic composition comprises a surfactant compound having a hydrophobic moiety chemically bonded to a nonionic, hydrophilic moiety.

17. The process of claim 1 wherein the concentration of tetrahaloferrate ion to be precipitated is no more than about 2000 ppm, and the amount of moles precipitant ranges from about 0.5 to about 2 times the number of moles of tetrahaloferrate form.

18. A thickened composition comprising:
(a) an aqueous haloacid solution;
(b) a thickening amount of a polymeric thickener or a viscoelastic surfactant composition selected from the group consisting of nonionic and cationic viscoelectric surfactants; and
(c) a precipitant for tetrahaloferrate anions comprising an onium species conforming to the structural formula:

$$(MR_n)^+X^- \qquad (I)$$

wherein
M is nitrogen, phosphorus or sulfur,
at least two R groups are hydrocarbyl or inertly-substituted hydrocarbyl groups comprising from about 3 to about 12 carbon atoms and each other R group is hydrogen, a hydrocarbyl group or inertly-substituted hydrocarbyl group, said R groups being chosen such that the moiety $(MR_n)^+$ is soluble in the acid solution but is not surface active and forms an insoluble precipitate with tetrahaloferrate anions,
n is the number of R groups bonded to the onium forming species, and
$X^-$ is a suitable counterion; said precipitant being present in a concentration sufficient to precipitate substantial amounts of tetrahaloferrate anion such that substantial viscosity of the acid composition is maintained.

19. The composition of claim 18 wherein M is sulfur and n is three.

20. The composition of claim 18 wherein M is nitrogen or phosphorus, and n is four.

21. The composition of claim 20 wherein the onium precipitant is a quaternary onium species.

22. The composition of claim 21 wherein $X^-$ is a halide, sulfonate, acetate or nitrate ion and each R is a hydrocarbyl group containing from about 3 to about 12 carbon atoms chosen so that the entire onium precipitant contains no more than 20 carbon atoms if the R groups are aliphatic or 25 carbon atoms if the R groups are aromatic.

23. The composition of claim 22 wherein each R group is an alkyl group of from 3 to about 6 carbon atoms, and wherein $X^-$ is a halide ion.

24. The composition of claim 23 wherein the precipitant is tetrabutyl ammonium chloride, tetrabutyl phosphonium chloride, tetraphenyl ammonium chloride and/or tetraphenyl phosphonium chloride.

25. The composition of claim 24 wherein $X^-$ is a halide, sulfonate, acetate, or nitrate ion, and one or two R groups are hydrogen and the remaining R groups are independently hydrocarbyl groups with from 3 to 12 carbon atoms chosen so that the entire onium precipitant contains no more than 20 carbon atoms if it is aliphatic or 25 carbon atoms if it is aromatic.

26. The composition of claim 25 wherein each hydrocarbyl group on the onium precipitant is an alkyl group of from 3 to 9 carbon atoms, and wherein $X^-$ is a halide ion.

27. The composition of claim 26 wherein the onium precipitant is a protonated form of tributyl phosphine, tripentyl amine and/or dioctyl amine.

28. The composition of claim 18 wherein said acid composition is a fluid comprising a haloacid at a concentration ranging from about 10 to about 40 percent, based on the weight of haloacid plus fluid.

29. A composition of claim 18 wherein there are about 0.5 to about 2 moles of precipitant for each mole of ferric ion in tetrahaloferrate form to be precipitated.

30. The composition of claim 18 wherein said thickened composition comprises a cationic viscoelastic surfactant composition, containing a cationic hydrophilic moiety chemically bonded to a hydrophobic moiety and a counterion sufficient to satisfy the charge of the surfactant ion.

31. The composition of claim 30 wherein said viscoelastic surfactant compounds are represented by the formula:

$$R_1(Y^{\oplus}X^{\ominus}$$

wherein $R_1(Y^{\oplus})$ represents a surfactant ion having a hydrophobic moiety represented by $R_1$ and an ionic, solubilizing moiety represented by the cationic moiety $(Y^{\oplus})$ chemically bonded thereto, and $X^{\ominus}$ is the counterion associated with the surfactant ion.

32. The composition of claim 20 wherein said viscoelastic composition comprises a surfactant compound having a hydrophobic moiety chemically bonded to a nonionic, hydrophilic moiety.

* * * * *

UNITED STATES PATENT AND TRADEMARK OFFICE
CERTIFICATE OF CORRECTION

PATENT NO. : 4,790,958

DATED : December 13, 1988

INVENTOR(S) : Arthur S. Teot, Midland, Mich.

It is certified that error appears in the above-identified patent and that said Letters Patent is hereby corrected as shown below:

Column 2, line 15, insert a period after the word "problems."

Column 3, line 6, the word "being" should be --begin--.

Column 3, line 33, the word "Smithet" should be --Smith et--.

Column 4, line 51, the word "compositin" should be --composition--.

Column 4, line 64, the word "faciliating" should be --facilitating--.

Column 5, line 38, the word "comples" should be --complex--.

Column 5, line 66, the word "secndary" should be --secondary--.

Column 6, line 24, insert the word --carbon-- between "25" and "atoms."

Column 7, line 20, the date "(1875)" should be --(1975)--.

Column 7, line 42, the word "an" should be --a--.

Column 8, line 24, insert a space between the "l" and "o" in the word "arylor."

Column 8, line 59, the formula "$CH_3(CF_2)_r CONH(CH_2)_s N^{\oplus} R''_3 X^{\ominus}$" should be --$CF_3(CF_2)_r CONH(CH_2)_s N^{\oplus} R''_3 X^{\ominus}$--.

Column 9, line 55, the word "a" should be --as--.

UNITED STATES PATENT AND TRADEMARK OFFICE
CERTIFICATE OF CORRECTION

PATENT NO. : 4,790,958

DATED : December 13, 1988

INVENTOR(S) : Arthur S. Teot, Midland, Michigan

It is certified that error appears in the above-identified patent and that said Letters Patent is hereby corrected as shown below:

Column 10, line 2, delete the comma after "No." Also, the patent "3,737,107" should be --3,373,107--.

Column 10, line 9, insert a comma after the word "general."

Column 10, line 23, the word "amaount" should be --amount--.

Column 11, line 29, the word "result" should be --results--.

Column 11, line 53, the word "composition" should be --compositions--.

Column 12, line 36, the word "bis(2-hydroyethyl)amine" should be --bis(2-hydroxyethyl)amine--.

Column 12, line 56, the word "as" should be --an--.

Column 13, line 8, the word "of" after the word "sample" should be --at--.

Column 13, line 48, Table II, under the heading "Sample No." the second number "12" should be --13--. The numbers under this column should be in correct order from 10 through 14.

Column 13, line 63, delete the word "containing" and insert --selected from the group consisting of nonionic and--.

Column 14, line 4, the word "inertyl-substituted" should be --inertly-substituted--.

Column 14, line 50, the word "choses" should be --chosen--.

UNITED STATES PATENT AND TRADEMARK OFFICE
CERTIFICATE OF CORRECTION

PATENT NO. : 4,790,958

DATED : December 13, 1988

INVENTOR(S) : Arthur S. Teot, Midland, Mich.

It is certified that error appears in the above-identified patent and that said Letters Patent is hereby corrected as shown below:

Column 15, line 25, the word "viscoelectric" should be --viscoelastic--.

Column 16, line 45, the formula "$R_1(Y^{\oplus}X^{\ominus}$" should be --$R_1(Y^{\oplus})X^{\ominus}$--.

Signed and Sealed this

Twelfth Day of September, 1989

Attest:

DONALD J. QUIGG

Attesting Officer

Commissioner of Patents and Trademarks